United States Patent [19]

Blakeslee

[11] 3,924,077

[45] Dec. 2, 1975

[54] PULSE CODE MODULATION TIME DIVISION MULTIPLEX TELEPHONE SYSTEM

[76] Inventor: Thomas R. Blakeslee, 172 Otis Ave., Woodside, Calif. 94062

[22] Filed: July 5, 1973

[21] Appl. No.: 376,843

[52] U.S. Cl. .............................. 179/15 AL; 343/178

[51] Int. Cl.² .............................................. H04J 3/08

[58] Field of Search ....... 179/15 AL, 18 CC, 15 BS, 179/15 BD, 15 BY, 15 A; 343/176, 178, 179; 178/2 A, 63 F

[56] References Cited

UNITED STATES PATENTS

| | | | |
|---|---|---|---|
| 2,406,165 | 8/1946 | Schroeder | 179/15 AL |
| 2,532,719 | 12/1950 | Homrighous | 343/178 |
| 2,651,677 | 9/1953 | Lair | 179/15 AL |
| 2,723,309 | 11/1955 | Lair | 179/15 AL |
| 3,529,089 | 9/1970 | Davis | 179/15 AL |
| 3,529,243 | 9/1970 | Reindl | 343/178 |
| 3,689,699 | 9/1972 | Brenig | 179/15 BS |
| 3,749,845 | 7/1973 | Fraser | 179/15 AL |
| 3,757,050 | 9/1973 | Mizote | 179/15 AL |
| 3,778,555 | 12/1973 | Nordling | 179/18 FC |
| 3,789,148 | 1/1974 | Ishii | 179/15 AL |

*Primary Examiner*—Ralph D. Blakeslee
*Assistant Examiner*—D. L. Stewart
*Attorney, Agent, or Firm*—Townsend and Townsend

[57] ABSTRACT

A pulse code modulation telephone system which allows a plurality of subscribers telephone sets to be connected at various points along a single wire pair. Each telephone contains circuitry for sending and receiving pulse coded speech samples at the proper instant within the time multiplexed frame. As the time slot assignment of each telephone is not fixed, it is possible to have several times more telephones on the line than time slots. Time slots are assigned only as needed by active telephones.

24 Claims, 19 Drawing Figures

PULSE CODE MODULATION TIME DIVISION MULTIPLEX TELEPHONE SYSTEM

BACKGROUND OF THE INVENTION

This invention relates to pulse type communications systems and more particularly to multichannel pulse code modulation time division multiplex telephone systems.

The availability of integrated circuits has made digital logic circuits less and less expensive. At the same time the cost of installing telephone cables has increased dramatically. Pulse code modulation (PCM) multiplexing techniques have proven to be an economical way to expand the capabilities of existing trunk cables by multiplexing 24 or more trunk signals on only two actual wire pairs. Once the voice signals are digitized, they can be switched much more economically by digital telephone exchanges.

Though most of the cost of the overall telephone system is in the local exchanges and lines, PCM techniques have not, as yet, proven economical for this part of the system. The reason for this is that the equipment cost for digitizing each local telephone line is prohibitive. The "concentration" stages of a local exchange connect a large number of local lines to a much smaller number of trunks. This can be done because at any given time most of the local lines are not being used and therefore do not have to be assigned to a trunk at all. Because the trunks are much more active and much fewer in number, PCM multiplexing of trunks has proven economically feasible.

Previous attempts to use PCM or delta modulation on local subscriber lines have proven economical only on very long rural lines. The reason for this has been the high cost of converting standard telephone signals to and from the digital format. The usual approach multiplexes many subscribers on to one line but still requires a separate connection of each subscribers telephone to the multiplexing equipment.

BRIEF SUMMARY OF THE INVENTION

The present invention places the digital coding and decoding and the multiplexing, demultiplexing, and concentration functions all on a large scale integrated circuit within each telephone. This makes it possible to connect many telephones along the same pair of wires. Since transmission in both directions takes place over the same wire pair, the existing subscribers wire pair, on a conventional telephone system, can be used to serve the existing subscriber plus many additional subscribers. It is thus possible to greatly expand the number of telephones that can be handled with existing wiring by simply connecting additional telephones in parallel on the existing wire pair.

Since the wire is terminated in its characteristic impedence at each end, a signal can be sent by any of the telephones and received at the exchange, or, when the exchange is sending, the signal can be received by all of the telephones on the line simultaneously. The exchange periodically transmits a burst, containing control bits and coded samples of the audio signals. This burst is received by all of the telephones and used to keep them in synchronism. Certain logical rules determine when each telephone will transmit in such a way that there is never more than one transmitter active on the line at a time. The time interval between bursts, known as the frame, is divided up into a number of fixed time slots, but these time slots are assigned to particular telephones only as needed. The number of telephones on the line can thus be much greater than the number of time slots available.

This assignment of time slots to telephones only as needed, is equivalent to the concentration function in the local exchange wherein many local lines are assigned as needed to a much smaller number of links in the switching network.

One of the objects of this invention is thus to effectively perform this concentration or line finding function within the telephones themselves thereby allowing local telephone exchanges to be essentially the same as toll exchanges and, therefore, making purely digital local exchanges eventually practical.

A more immediate object of the present invention, however is to allow a significant expansion of the telephone network using existing local wire pairs without the necessity of adding separate multiplexing equipment remote from the exchange and special wiring from that multiplexer to the individual telephones. In this invention, a group of telephones all connected to the same wire pair essentially constitute a multiplexer-concentrator with the required logic distributed among the many separate telephone sets along the line.

Another object of this invention is to improve the quality of telephone service by allowing eventually complete digital handling of signals from one telephone set to the other.

A further object of this invention is to make possible many new, non-voice, telephone services due to the fact that each subscriber essentially has a high speed data link at his disposal.

Another object of this invention is to make it practical to further reduce line costs on long lines to the local exchange by allowing very simple multiplexing of the already digital, signals to standard, four-wire, PCM formats at higher data rates. Standard digital repeaters can then be used to go any distance.

DESCRIPTION OF THE PREFERRED EMBODIMENT

FIG. 1 is a simplified embodiment presented to illustrate the system operation in its simplest form. A plurality of telephones 400 connected in parallel along a single twisted pair telephone line 406 can originate and receive a multiplicity of simultaneous calls. The term "parallel38 as used in this specification and in the claims appended hereto is intended to connote the fact that the telephones and the exchange are connected by a single wire pair and the signals from the exchange are received by all of the telephones 400.

The line 406 is used for transmission in both directions on a time shared basis. Each telephone contains logic for maintaining synchronism with the exchange, coding and decoding periodic speech samples, and sending and receiving the samples during the correct time slot. Terminating resistors 402 on each end of the line prevent signal reflections. Since power for the telephones is fed from the exchange and appears as a D. C. voltage across the pair, the terminators include a blocking capacitor 404.

Figure 1A:
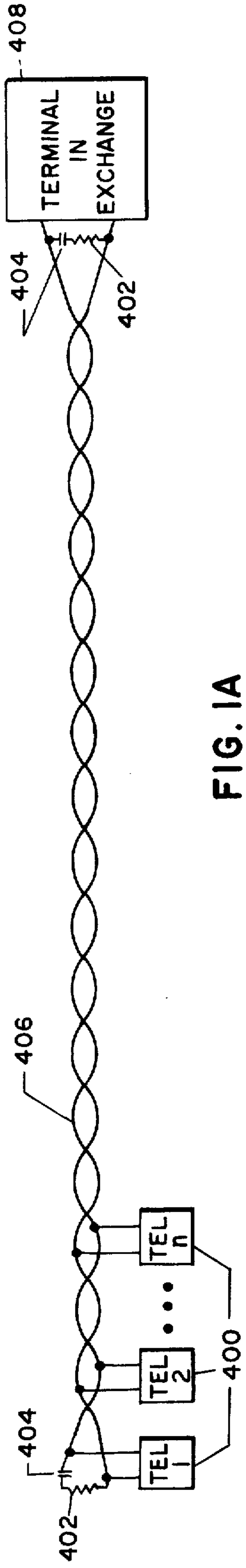
FIG. 1A is a system block diagram illustrating the manner in which many telephone sets can be connected to a single wire pair to the exchange.
Figure 1B:
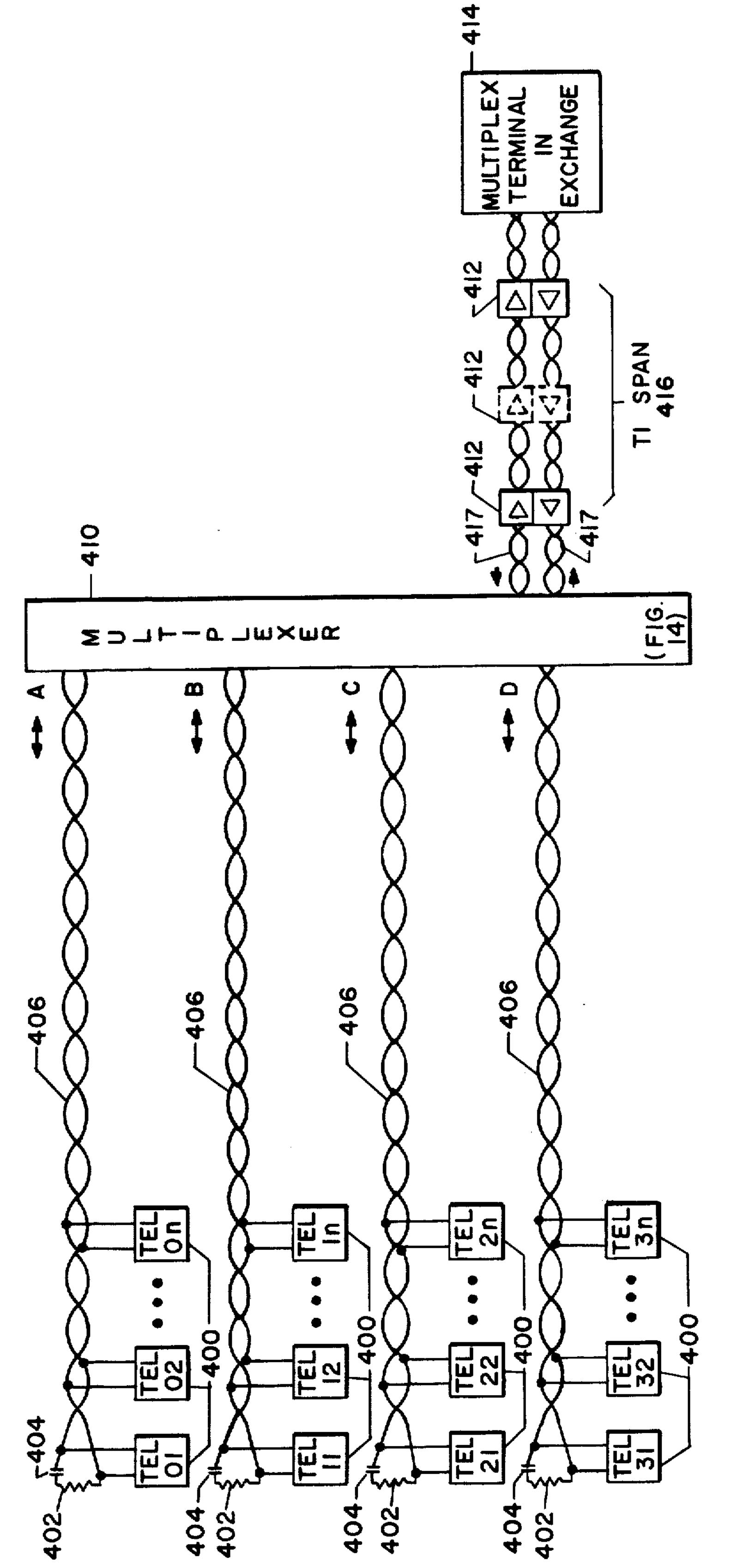
FIG. 1B is a system block diagram illustrating the preferred embodiment in which a plurality of bidirectional lines are multiplexed into two, standard, unidirectional, lines.

While the configuration in FIG. 1A could be used for telephones which are relatively close to the exchange, the preferred embodiment, shown in FIG. 1B, is more general in that it can handle telephones at any distance.

In the preferred embodiment a plurality of twisted pair telephone lines 406, each having a plurality of telephones 400 connected along it, are multiplexed by multiplexer 410 into a standard Pulse Code Modulation span 416 consisting of one telephone line 417 in each direction, with digital repeators 412 placed along the line as needed. For telephones close to the exchange, no repeaters are needed, in fact, the multiplexer 410 may be placed in the exchange and connected directly to the terminal 414.

The embodiment to be described is designed for easy interfacing to systems using the T1 system of American Telephone & Telegraph as described by C. G. Davis in the Bell System Technical Journal of January 1962. The principles of the invention can be applied as well with different data rates, different frame formats, different coding methods such as delta modulation, and even for non-voice communications services.

Figure 2:
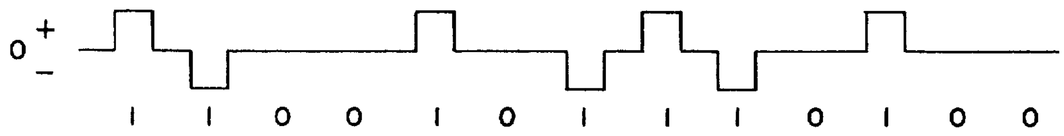
FIG. 2 is a graph illustrating the AMI signal wafeform used for transmission.

FIG. 2 shows the signal format. A one bit is indicated by a pulse of either polarity and a zero is indicated by no pulse. The polarity of the pulses always alternates to keep the D.C. component of the signal zero. This is the same AMI coding that is used in the T1/PCM system referred to above except that according to the preferred embodiment of the present invention the data rate is only half as fast. This slower data rate greatly reduces crosstalk problems and makes it possible to use a very simple send and receive circuit.

Figure 3:
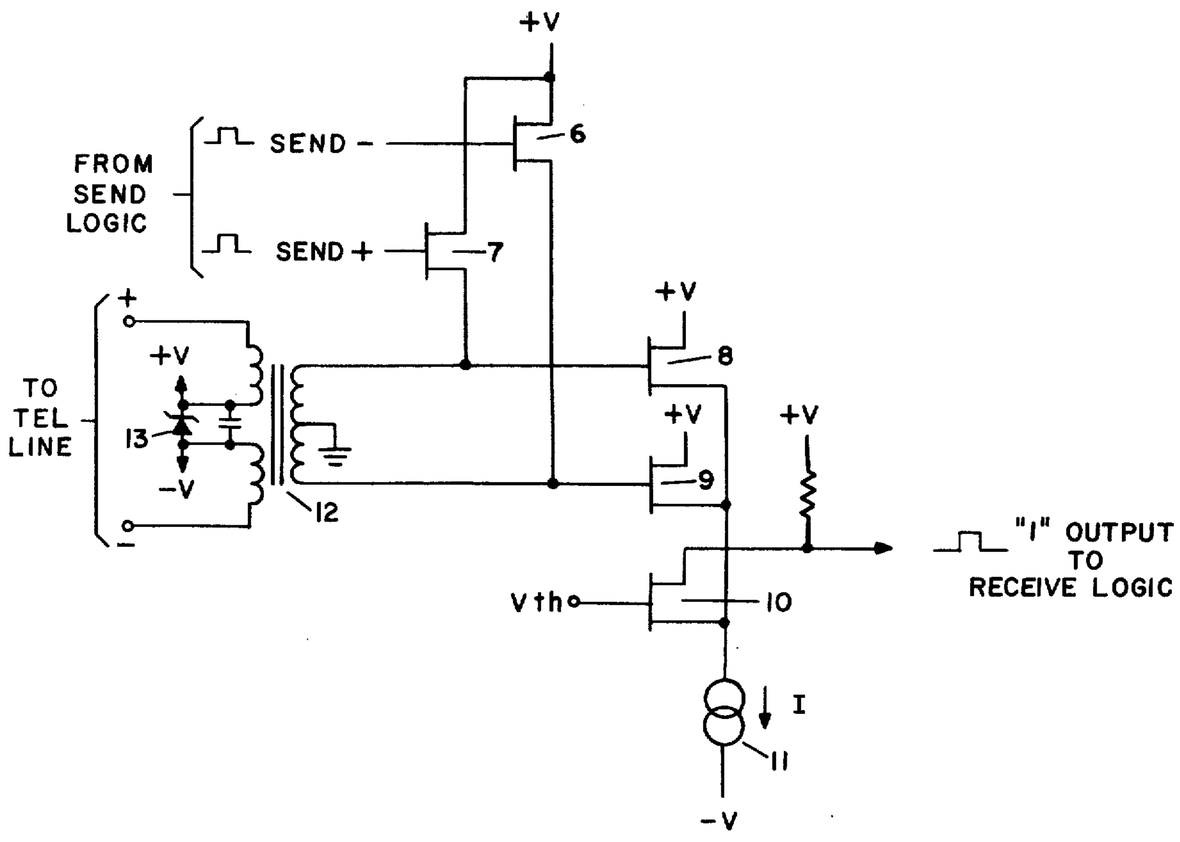
FIG. 3 is a circuit schematic of the basic circuit used for transmission and reception of data by each telephone set.

FIG. 3 shows the circuit used in each telephone to send and receive data. The signal is coupled through a small, ferrite core, pulse transformer 12 to the output of send, switching, field effect transistors 6 and 7 and also to the source coupled, receive threshold transistors 8 and 9. D.C. power, fed from the exchange, appears across a zener diode 13 and is used to power all of the circuitry in the telephone. Most of the circuitry in the telephone is preferably mechanized using large scale MOS integrated circuits.

Normally the send transistors 6 and 7 are turned off and have no effect on the circuit. The receive circuit makes use of the inherent matching of transistors on the same integrated circuit chip. Current I 11 will flow through transistors 8, 9 or 10 depending on which has the highest gate voltage. Since the threshold voltage $V_{th}$ is on the gate of 10, I will flow through 10 when the signal is zero. At + will cause I to flow through 9. Since either a + or a − pulse above the threshold represents a binary one, the signal on the drain of 10 goes high whenever a one is received.

When a telephone is active it must send a start bit followed by a 7 bit PCM sample at the proper time every frame interval or 125 microseconds. To send a + or − pulse the logic simply turns transistor 7 or 6 on at the proper time and for the proper duration.

Figures 4, 5:
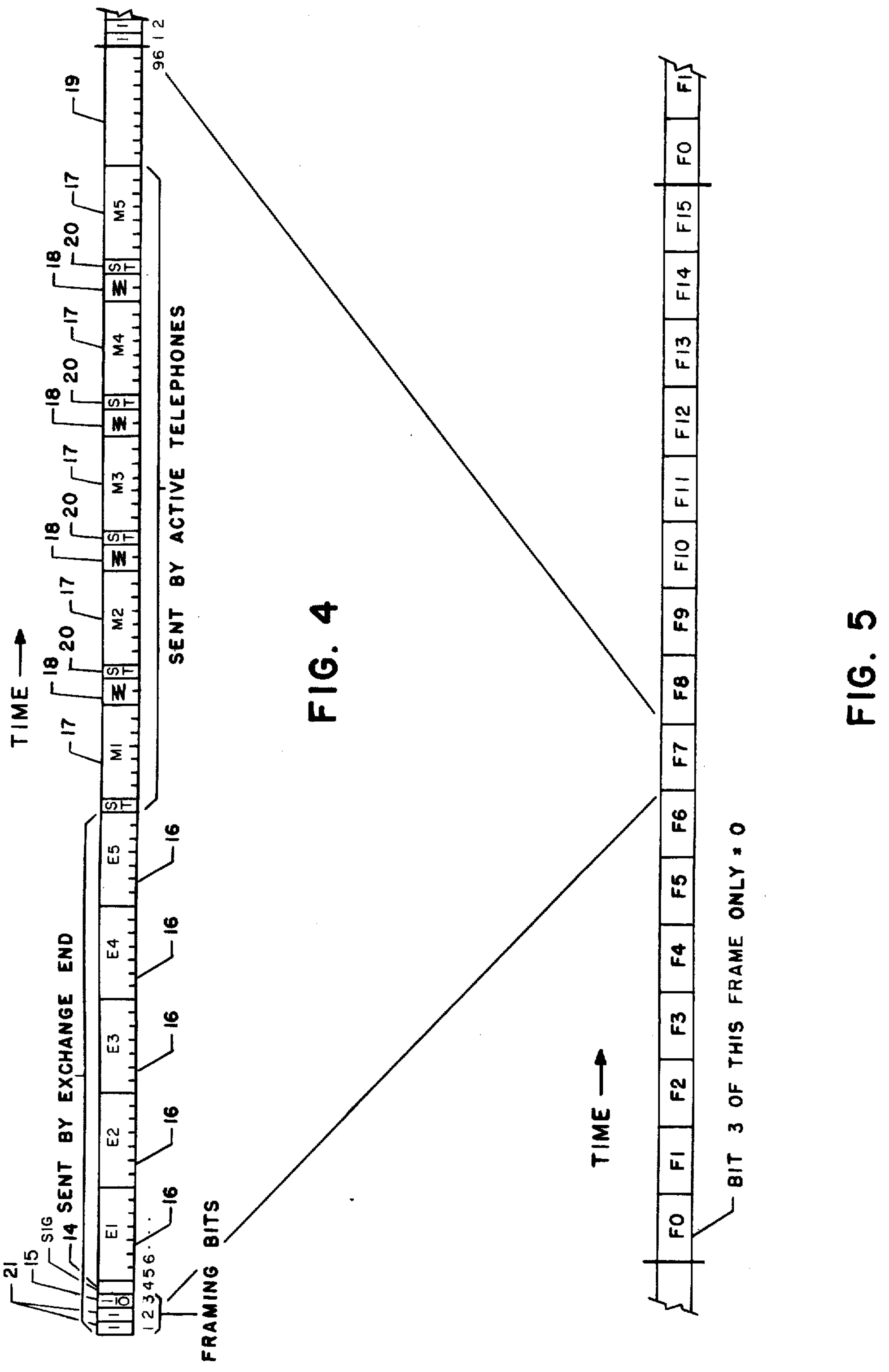
FIG. 4 is a timing diagram showing the 96 bit frame format used in the system as it appears at the telephones.
FIG. 5 is a timing diagram showing the 16 frame multiframe format.

Since speech samples must be sent in both directions every frame or 125 microseconds, each 125 microsecond frame interval is divided into a repetitive series of 96 bits as shown in FIG. 4. The first 39 bits of the frame are sent by the exchange and the remainder of the frame is reserved for transmission by the telephones. The first 3 bits of the transmission from the exchange 21 and 15 are used to keep the telephones in synchronism. The fourth bit is a signaling bit, whose use will be explained later. The remainder of the transmission from the exchange consists of five, 7 bit samples 16 of the earphone voltage for the telephones. These time slots are numbered E1 through E5 and effectively serve as five analog trunks to carry earphone signals to the telephones. Since according to the preferred embodiment up to 16 telephones can be connected along a single line, these time slots are logically assigned on a first come first serve basis to allow up to 5 simultaneous calls over a single line. When a telephone is assigned to a time slot, it sends its microphone samples over the M time slot 17 with the same number as the E time slot over which it receives samples for its earphone.

The timing shown in FIG. 4 is as it appears at the telephone. Due to the propagation delay of the line, the M samples will arrive at the exchange later than shown on FIG. 4. by the round trip delay time of the line. Because of the delay, it is necessary to provide a timing guard band 19 to be sure that the last bit of M5 is received by the exchange before the exchange begins transmitting. Since the round trip delay to each telephone on the line is different, each M sample transmission begins with a start bit 20 which sets the phase of the receive clock in the terminal. A guard band 18 is provided between M samples to prevent two samples from overlaping due to differences in the round trip delay to telephones on adjacent time slots. The maximum difference between the distance to the farthest and the closest telephone on a line must be kept less than 800 feet to avoid using up this guard band.

As FIG. 5 shows, 16, 96-bit frames constitute a multiframe. Each 125 microsecond frame can thus be thought of as having a number from 0 to 15 associated with it. Each telephone on a line is permanently assigned a unique address from 0 to 15 by a jumper option. Each telephone thus has its own frame number within the multiframe during which it can connect itself by sending during the first free M slot, or receive ringing or test signals from the exchange via the signaling bit 14. Frame zero is identified by the fact that the third framing bit 15 on FIG. 4 is zero during frame zero only.

When a subscriber picks up his telephone, the logic in the telephone waits till the frame number corresponding to the address of that telephone. It locates the first free time slot by looking for the first time slot 16 E1 through E5 containing an all zero "idle" code. When the M time slot 17, having the corresponding number comes up, it takes that time slot by sending a special code during that time slot. The terminal in the exchange detects this code and knows by the frame number during which the code first appeared which telephone has gone off hook and taken that time slot. The terminal immediately marks that time slot as being occupied by sending a non idle conde during the corresponding E time slot 16. The terminal also signals the exchange that this subscriber has gone off hook causing a dial tone to be sent by the exchange over the assigned E time slot 16. The subscriber now begins dialing the number he is calling using a keyboard on the telephone. Each key pressed simply causes the logic in the telephone to send a digital code for that key during the proper M time slot 17. The terminal in the exchange receives these codes, and signals the number called to the exchenge. After the first key is pressed, the exchange stops sending the dial tone and the terminal just sends a special digital code. After the last digit is accepted, this code stops and the logic in the telephone begins sending PCM coded samples of the microphone signal during the proper M time slot 17. We then have a normal telephone connection with PCM coded audio samples sent in both directions. When the call is complete, the calling subscriber hangs up causing the telephone to stop sending M samples 17. The terminal signals the exchange about the disconnect and resumes sending idle codes in the E time slot 16.

If all time slots had been occupied when the subscriber had picked up his telephone, the logic in the telephone would simply keep trying to find the first free time slot unsuccessfully so no dial tone would be heard. The actual number of telephones to be used on single line is calculated to make this a rare occurrance. For normal residential service the maximum of 16 on a line gives adequate service as the chance of having more than five active calls at a time is very small, but for telephones having higher usage, the maximum number may have to be less than 16.

The called party is connected by the use of the signaling bit 14. If the signaling bit goes true during the frame number assigned to an on hook telephone, it takes the first free E time slot 16 as its own and begins ringing and sending an on hook code on the corresponding M time slot 17. The terminal in the exchange assigns the same first free time slot to this telephone and continues sending the signaling bit until it receives an answer code from the telephone on the M time slot 17. After answer, both the exchange and the telephone send PCM speech samples over the assigned time slot providing a voice connection. If the called party hangs up, transmission on the assigned M time slot ceases causing a disconnect at the exchange after a time delay.

Ringing tones are generated by the integrated circuit in the telephone during the time the telephone is still on hook but is receiving the signaling bit. Since the tone does not start until the second multiframe with a signaling bit, a very powerful routine self test can be performed by periodically signaling each of the telephones on the line once and verifying that they send back the on hook code over the proper M time slot. This confirms not only that each telephone is sending and receiving data properly, but also that the logic is in synchronism and working properly. It is thus possible to detect failures of lines or even individual telephone sets before the subscriber is aware of them.

Figure 6:
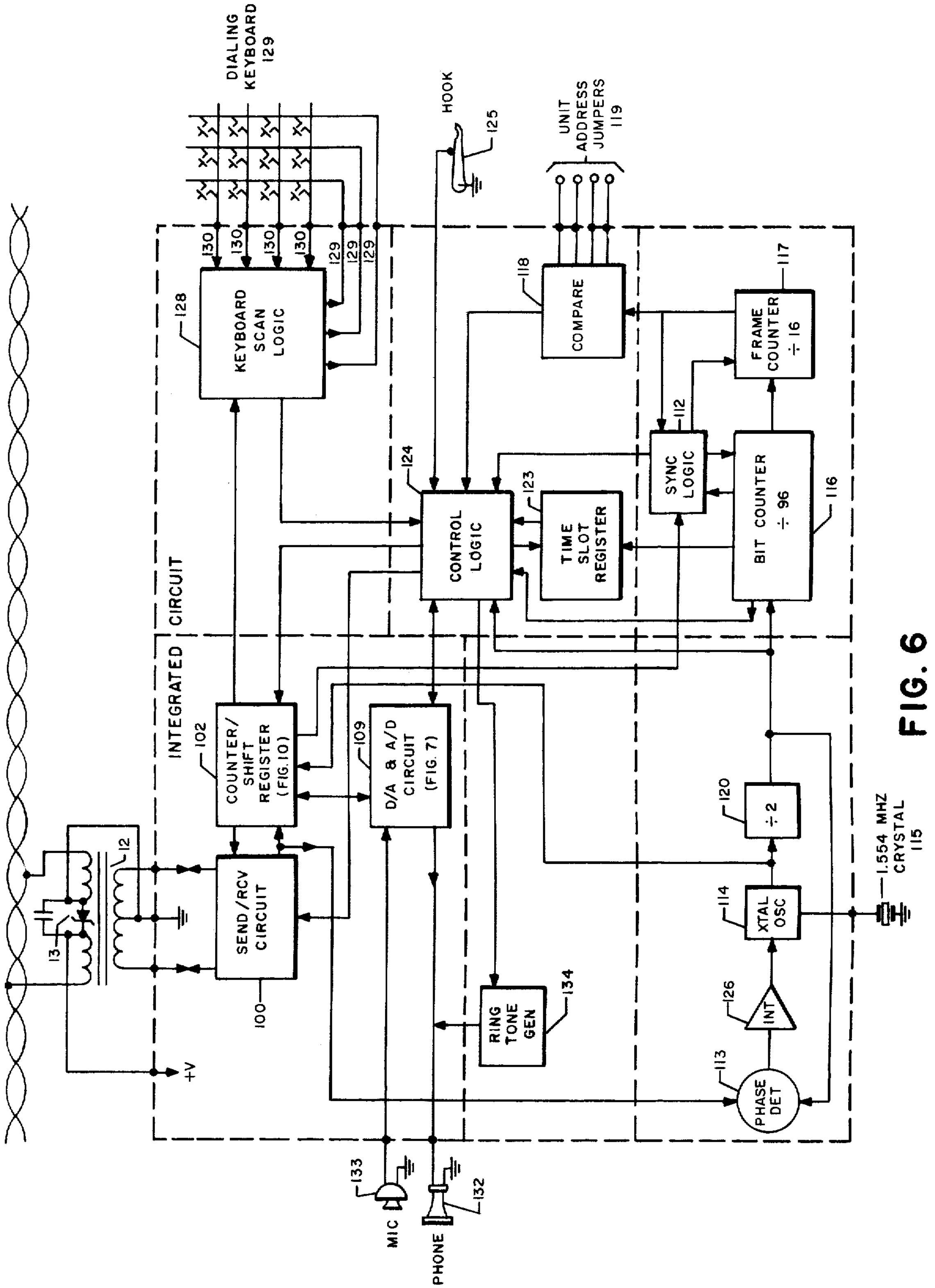
FIG. 6 is a simplified block diagram of the digital telephone set.

FIG. 6 is a simplified block diagram of the complete digital telephone. Certain circuit details, such as the integrating capacitor and low pass filters, may optionally be mechanized with discrete components. The dashed line subdivisions of the rectangle indicate the major functions. Phase detector 113, integrator 126, crystal oscillator 114 and ÷ 2 circuit 120 constitute a phase locked loop crystal oscillator which locks into phase with the transmissions from the exchange. This clock drives the bit and frame counters 116 and 117 which are kept in synchronism with the signal from the exchange by the sync logic 112. The bit and frame counter controls all operations via the control logic 124, time slot register 123 and unit address comparison circuit 118. When a call is originated the keyboard scan logic 128 generates digital codes for dialing the number. Incoming calls activate the ring tone generator 134 causing the telephone to ring. Once a call is completed, microphone and earphone voltages are converted to and from the digital format by D/A and A/D convertor circuit 109 using counter shift register 102 and send/receive circuit 100. These two circuits are also used to send and receive keyboard and ringing signals, and to receive framing bits to keep the system in synchronism. A ferrite pulse transformer 12 couples the circuit to the line and derives power for the circuits from the line across zener diode 13.

The oscillator 114 and crystal 115 oscillates at twice the bit rate of the incoming signal from the exchange. The phase locked loop defined by phase detector 113, integrator 126, oscillator 114 and ÷ 2 circuit 120 keeps the frequency, and phase locked to the incoming signal from the exchange by comparing the phase of the bit clock output of count down flip flop 120 with the signal received from the exchange. A correction voltage is generated by integrator 126 which alters the crystal oscillator frequency slightly as required to lock it in to the signal. The oscillator output at twice the bit rate is used to operate the counter 102 in the D/A and A/D conversion process. The counted down clock, at the bit rate, is used for shifting data in and out under control of the control logic 124 and to operate the bit counter 116.

Having established clock synchronism with the signal from the exchange, we must now establish bit and frame sync. A bit counter 116 and frame counter 117 count in synchronism with the bits and frames received from the exchange. The sync logic 112, maintains frame sync by checking the framing bits 21 and 15 (shown on FIG. 4), at all times. If the framing bits are not correct for two consecutive frames, it is assumed that synchronism has been lost so the telephone set is disabled until sync is regained. If the framing bits are still incorrect on the third frame, the bit counter is held until three consecutive 1 bits are detected. The bit counter is then released on the assumption that the three 1's were frame code bits. If this is confirmed on the following two frames, it is assumed that bit synchronism is re-established. A similar procedure is followed to establish multiframe synchronism. Every frame 0, the third framing bit 15 should be 0. If this is not true for two consecutive multiframes the frame counter is held in the 0 state until a zero third framing bit is detected. If the next 15 frames have a 1 for the third framing bit, and the 16th frame has a zero, frame sync is established and the telephone set can be enabled.

Normally the phase locked loop of the crystal oscillator 114 is enabled only during the first 39 bits of the frame as only these bits are sent by the exchange. When bit synchronism is lost, the phase locked loop is enabled continuously. The crystal oscillator still locks fairly accurately to the phase of the exchange clock because, on transmissions from the exchange, zeros are indicated by a pulse on the line while on transmissions from the telephone sets ones are indicated by a pulse on the line. Since the statistical probability of transmission of zeros is much higher than ones with pulse code modulation, the signal from the exchange has a much higher timing content than that of the telephone sets.

A digital comparison circuit 118 compares the frame counter state with the unit address of the telephone which is set by jumpers 119 on installation. If the signaling bit 14 (shown on FIG. 4), goes true during the correct frame twice in a row, the ring signal generator 134 is enabled, producing a loud ring signal through the earphone 132. The unit address comparison circuit 118 is also used to make a connection when the subscriber goes off hook 125. When the compare circuit detects the correct frame, the first free E time slot number, as indicated by minus zero sent by the exchange during that time slot, is held in the time slot register 123. Transmission of a connect code by the telephone set starts immediately in the corresponding M time slot. .he code in the time slot register 123 is taken as a permanent assignment and is used for the duration of the call to enable transmission and reception.

Before transmission of speech samples begins, push button dialing of the number must be accomplished. This is done using a 4 × 3 matrix of push buttons 129. The Keyboard scanner logic 128 uses counter 102 to scan the Keyboard by checking each of the 12 combinations of 3 outputs × 4 inputs for a closed key contact. When a contact is closed, a binary code is sent indicating the proper key. This is done by using two of the counter bits to select one of three output lines 129 to go low, and two more counter bits to select one of four input lines 130 to examine. If the examination shows a low signal, it means the key corresponding to the four bit binary code is pressed so that code can be sent. Each valid binary code selects a different combination of input lines 130 and output lines 129 and therefore examines a different key. When a low signal is detected, the code in the counter thus corresponds to the code for the key being pressed.

After dialing is complete, a control code from the exchange switches the keyboard scanner logic 128 off and enables the digital to analog and analog to digital converter 109. E samples 16 (shown on FIG. 4) from the exchange thus produce an audio signal in the earphone 132 and microphone signals 133 produce digital M samples 17 which are sent to the exchange. An audio connection is thus established digitally. The digital to analog and analog to digital conversion cycles are controlled by the bit counter 116.

Figure 7:
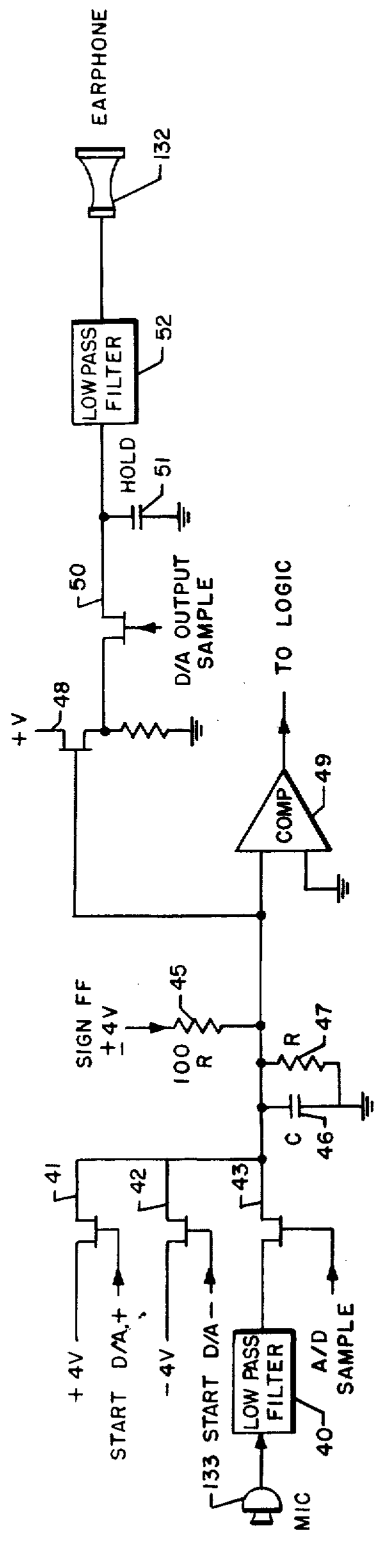
FIG. 7 is a schematic diagram of a circuit for logarithmic compression/encoding and decoding/expansion of the voice signals.

Though other digital coding techniques, such as delta modulation, could be used for transmission of the speech samples, an easier interface to presently planned digital exchanges can be obtained by using a normal 7 bit PCM coding with logarithmic compression. FIG. 7 shows a D/A and A/D convertor circuit 109 which does compression and analog to digital conversions as well as analog to digital conversions with expansion using only circuits which are easily produced with the same type of large scale integrated circuit technology which is needed to perform the digital logic required by the system. It is thus possible to put all of the functions required in the telephone on a single monolithic chip.

Field effect transistors 41, 42 and 43 act as analog sampling gates to connect + full scale, −full scale or the filtered microphone voltage respectively to capacitor 46. A resistive divider formed by resistors 45 and 47 causes an expoential discharge of capacitor 46 toward plus or minus 40 millivolts depending on the state of the sign flip flop 154. An analog compare circuit 49 indicates to the control logic whether the voltage or capacitor 46 is above or below the ground reference. Source follower 48 makes it possible for a sample and hold circuit consisting of transistor 50 and capacitor 51 to sample the voltage on capacitor 46 without disturbing it. Finally a low pass filter 52 removes sampling noise before driving earphone 132.

At the beginning of each frame, a sample of the low pass filtered microphone voltage is stored on capacitor 46 by sampling gate 43. Comparator 49 tests the polarity of the sample and stores it on a flip flop in the logic. The charge on the capacitor 46 starts exponentially discharging through resistors 45 to 47 toward either + or − 40 mv depending on the signal applied to resistor 45 by the flip flop 154 which previously stored the sign. This 40 mv offset is always of a polarity opposite that of the signal. During the discharge, a 6 bit binary counter 156 counts at twice the bit rate until the comparator 49 detects that zero volts has been reached. The state of this counter, together with the sign bit, gives the correct PCM code for the sample.

Figure 8:
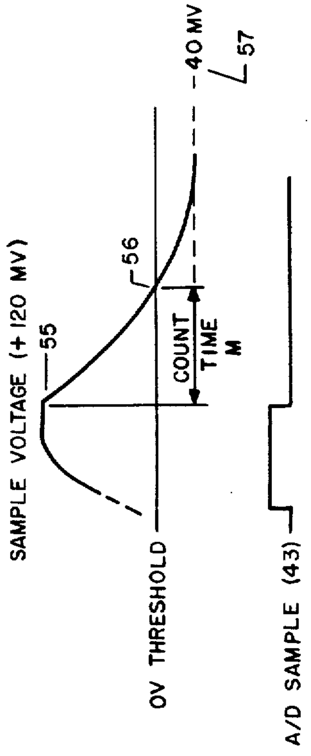
FIG. 8 is a graph showing the waveform on capacitor 46 during compression/analog to digital conversion of a + 120 mv microphone sample.

FIG. 8 shows the voltage waveform on capacitor 46 during a typical compression/analog to digital conversion cycle. The time required for the voltage sample 55 to discharge to zero volts is proportional to log $(1+\mu(V/V)_{max})$ where $V$ is the sample voltage, $V$ max is the maximum allowable signal voltage, and $\mu$ is the ratio of $V$ max to the offset voltage. This is the same "mu law " compression used in standard T1 PCM transmission. The standard value of $\mu$ for 7 bit PCM transmission is 100 so we use an offset voltage here of 1/100th of V max. In the circuit shown in FIG. 10 V max is ±4v so the offset produced by resistor 45 should be ±40 mv. Since it takes 4.61 time constants for an exponential to reach 1/100 of its initial value the time constant of RC 46 and 47 should be the time it takes to count up to 64 divided by 4.61. When the counting is done at twice the communications bit rate, a time constant of 8.91 microseconds is thus required.

A maximum sample of + or -- 4v will thus take 64 counts to discharge to 0v. The 6 bit counter will thus encode this as a 7 bit code beginning with 1 or 0 for + or − followed by 6 1's for the magnitude. A zero volt sample will be at the threshold of the comparator 49 immediately so the counter does not count at all and the 6 magnitude bits are zero. For any voltage between these extremes, the counter will stop at some intermediate binary value representing the logarithmically compressed signal voltage.

Figure 9:
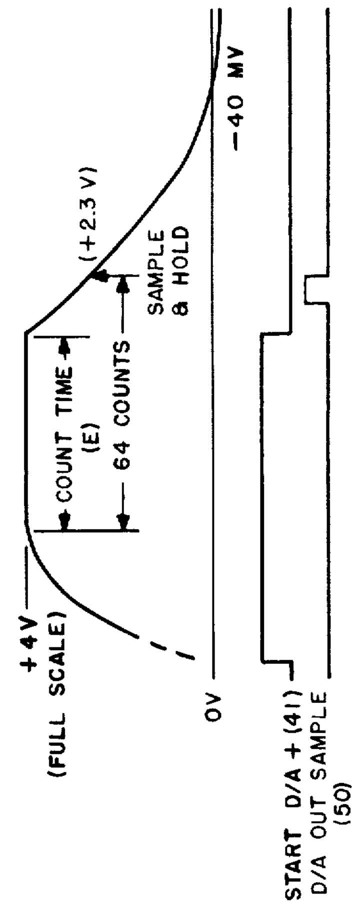
FIG. 9 is a graph showing the waveform on capacitor 46 during digital to analog conversion/expansion of a +2.3v earphone sample.

During each 125 microsecond frame, the circuit of FIG. 7 does both an analog to digital and a digital to analog conversion. FIG. 9 shows the voltage on capacitor 46 during a typical digital to analog conversion/expansion cycle. Depending on the sign bit received, + or − 4v is connected to capacitor 46 by sampling gates 41 or 42. This voltage is held on capacitor 46 while a digital counter loaded with the Earphone sample magnitude bits counts down to zero. When the counter reaches zero, the sampling gate is turned off allowing the voltage on capacitor 46 to charge towards the opposite polarity, 40 mv offset voltage produced by resistor 45. The voltage remaining on capacitor 46 is stored on capacitor 51 via source follower 48 and sample gate 50 at the end of the fixed, 64 count, cycle. This voltage remaining is the correct, logarithmically expanded, sample represented by the 7bit binary code received. A low pass filter 52 removes all frequency components above 4khz and sends the signal to the earphone 132.

Since the RC time constant of capacitor 46, and resistor 47 must be fairly accurate to prevent distortion of small signals, a self correction negative feedback circuit may be included. A field effect transistor can be connected in series with the grounded end of resistor 47 adjusts the RC time constant. The RC time constant set by the gate voltage of this transistor as held by a large gate capacitance. Leakage would tend to slowly reduce the voltage on this capacitor and therefore reduce the RC time constant. Whenever the comparator 49 detects that the voltage waveform of FIG. 9 has crossed zero volts during the digital to analog conversion cycle, the RC time constant would be increased slightly. Over a long period of time the RC time constant would thus stabilize at a point where the voltage waveform would occasionally just cross the zero volt threshold at the end of the digital to analog conversion cycles where the received earphone sample is zero volts. Since the same RC time constant is used for analog to digital conversion, this self adjusting time constant would always correct for both A to D and D to A conversion.

A similar self adjusting circuit can be used to adjust the zero volt microphone signal point by shifting the zero volt level till the long term average number of microphone samples with + sign bit equals the number of samples with a − sign bit. This would be done by slowly shifting the zero reference towards + when the sign bit is + and towards − when the sign bit is −. The zero volt reference level would thus stabilize at a point where the average number of + and − M samples is equal.

Figure 10:
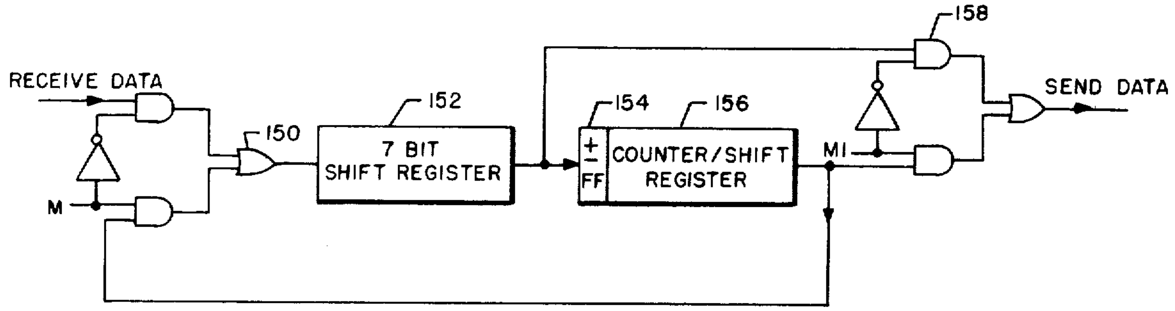
FIG. 10 is a schematic of the counter and shift register used to send and receive samples and to count during conversion.

The actual counting during conversion and shifting in and out of E and M samples is done in the circuit shown in FIG. 10. This circuit consists of a seven bit register 152 whose input is the received data except during the portion of the frame during which the M samples are transmitted. During that time its input is from another 7 bit shift register 154 and 156. The first stage of this register has additional logic to allow it to be used as the sign flip flop in D/A and A/D conversions. The other six stages 156 also serve as a counter in the D/A and A/D conversions. Digital selector 158 connects the output of this register to the send logic 100 on FIG. 6 only during time slot M1. During the other M time slots data is sent from the other register 152.

Figure 11:
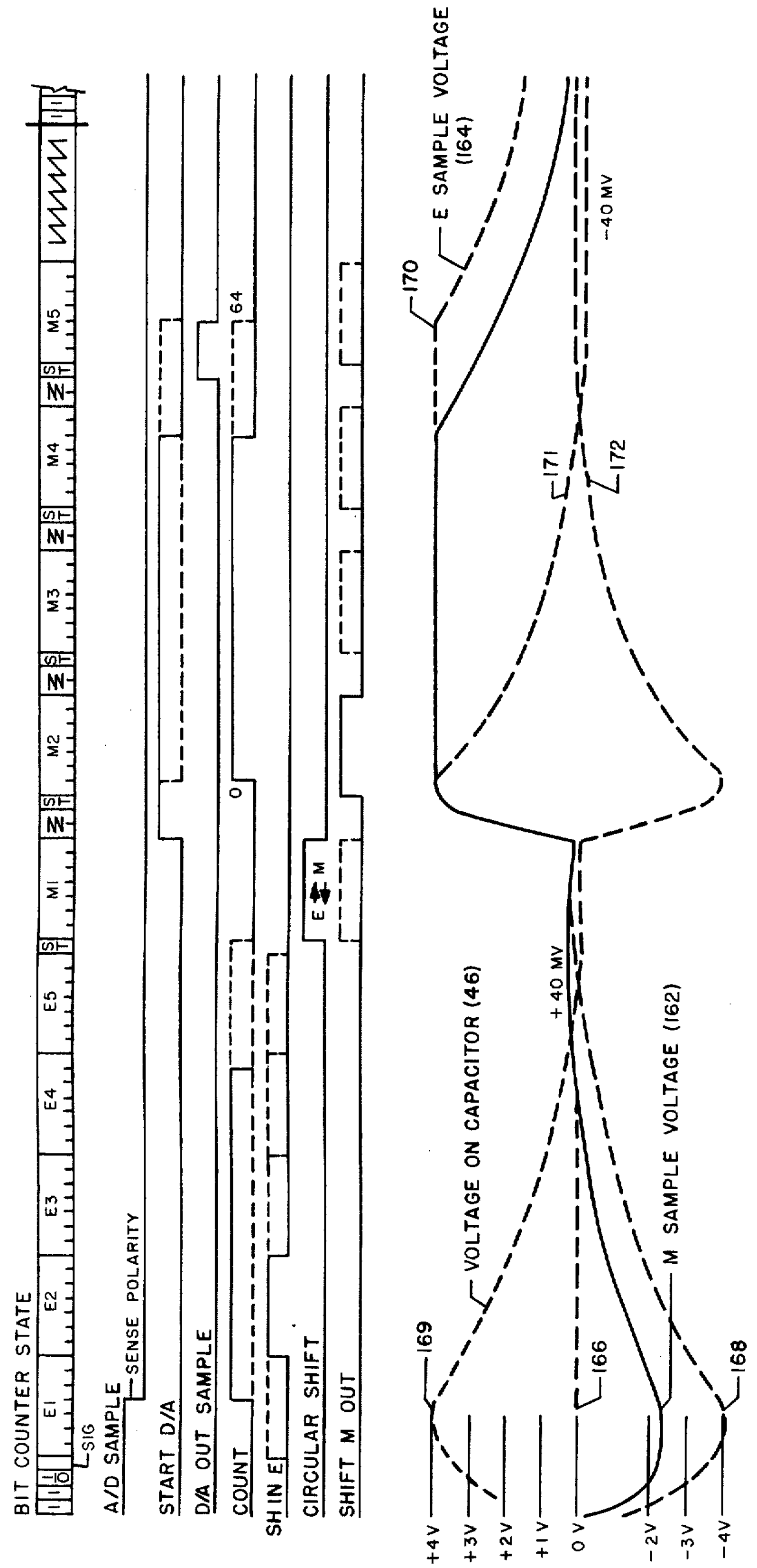
FIG. 11 is a timing diagram showing the timing of the various operations required to send and receive voice samples and convert them to and from analog form.

The timing of the operation of the circuits in FIG. 10 and FIG. 7 are shown on the timing diagram FIG. 11. This diagram is drawn assuming a Microphone sample of −2.3 volts 162 and an Earphone sample of + 2.3 volts 164 but dashed lines 166, 168, 169, 170, 171 and 172 additionally show the wave forms for plus and minus full scale and zero volt samples. FIG. 11 also assumes that the time slot assignment for the telephone is slot number two, but dashed lines show the possible signals for other time slot assignments.

The bit counter states at the top of the diagram of FIG. 11 are a replica of the frame format in FIG. 4. As the bit counter is in synchronism with the signal received from the exchange it is used to control all operations in the telephone. The conversion cycles alternate between A/D conversion and D/A conversion during each 125 microsecond frame. The shift register 152 is also used alternately to receive E samples and to send M samples.

During the first 8 bits of the frame the microphone voltage is gated onto capacitor 46 by the A/D sample signal. The sign of the sample is strobed into sign flip flop 154 at the end of the sampling time. Counter 156 counts until the capacitor voltage reaches zero volts then it stops with the correct binary magnitude of the M sample in it. During the A/D conversion, the E sample is shifted into shift register 152 by the SH IN E signal during the assigned time slot. During M1 the circular shift signal causes registers 152, 154 and 156 to shift at the bit rate such that the M sample ends up in register 152 and the E sample ends up in register 154 and 156. If the assigned time slot was M1 the sample is sent out during this shift via the lower half of gate 158. If one of the other time slots is assigned, the sample is shifted out of register 152 during the proper time slot. As soon as the circular shift is completed the start D/A signal of the proper polarity puts a full scale voltage of the proper polarity on capacitor 46 the counter 156 then counts at twice the bit rate and the start D/A signal is held true until the counter reaches zero. The D/A output sample gate 50 samples the voltage remaining on the capacitor at a fixed time to produce the analog earphone voltage sample. The shift register 152 and counter/shift register 154 and 156 are thus time shared alternately between handling E samples and M samples.

One of the advantages of digital telephone transmission is that digital repeaters can be placed at intervals along long lines to regenerate the signal. While a repeater could be designed for the bidirectional telephone signal of FIG. 4, the timing guard band 19 on FIG. 4 puts a limit of 3600 feet on bidirectional line length. At greater than that length, the round trip delay on the line would delay the M5 sample so much that it would not be completely received before the first bit of the frame code 21 would have to be sent. A more efficient distribution approach is to combine four bidirectional lines into a standard T1 signal. Since T1 transmission uses a separate wire pair for each direction, there is no limitation on the distance. Millions of T1 digital spans are already in service in the United States so engineering of lines and repeaters is well known. Also, further multiplexing by a factor of 4 is possible using the standard M1-2 multiplexer. This multiplexer is described in a paper by Mr. R. A. Bruce, of Bell Telephone Laboratories, in the Proceedings of the International Communications Conference of 1969, I.E.E.E. number 69 CP368–COM. The output of the M1–2 multiplexer is a T2 repeatered line with a data rate of 6.312 Mb/sec. It is thus possible to handle 4×16=64 telephones on a double twisted pair T2 line. FIG. 1B shows how the T1 multiplexer is used to connect four bidirectional lines A, B, C, and D to a single T1 span.

Because of differing requirements in the two directions of transmission, two different multiplexing formats are used: In the E direction, timing of all signals on the bidirectional lines is fixed, so multiplexer hardware is reduced by using a bit interleaved format. In the other direction buffers are needed in the multiplexer to put the M samples into fixed time slots, since their timing varies due to round trip delay on the bidirectional line. Since the buffers are needed anyway, the M samples are sent byte interleaved. This allows some hardware savings in the exchange terminal.

Figure 12:
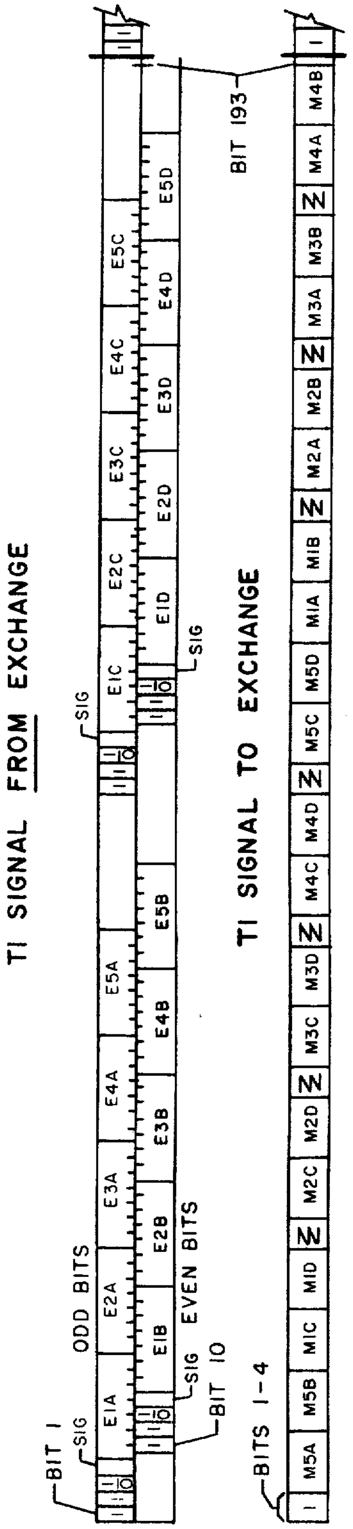
FIG. 12 is a timing diagram showing the T1 multiplexed format for signals to and from the exchange.

FIG. 12 shows the format of the 193 bit T1 signal coming from the multiplex terminal in the exchange. During the first half of the frame, the odd numbered bits are sent out over bidirectional channel A and the even numbered bits are sent over channel B. During the second half of the frame, the odd numbered bits go out over bidirectional channel C and the even numbered bits go out over channel D. We thus have all of the outgoing signals for four bidirectional channels over a single, standard T1 span.

In the other direction, since buffers are needed anyway to bring the M samples into fixed time slots in the frame, the M samples are sent in a byte interleaved format as shown in the bottom of FIG. 12. The time slots of the odd and even, bit interleaved, E samples are offset by 4 bytes to reduce the buffering necessary to alternately send M samples.

Figure 13:
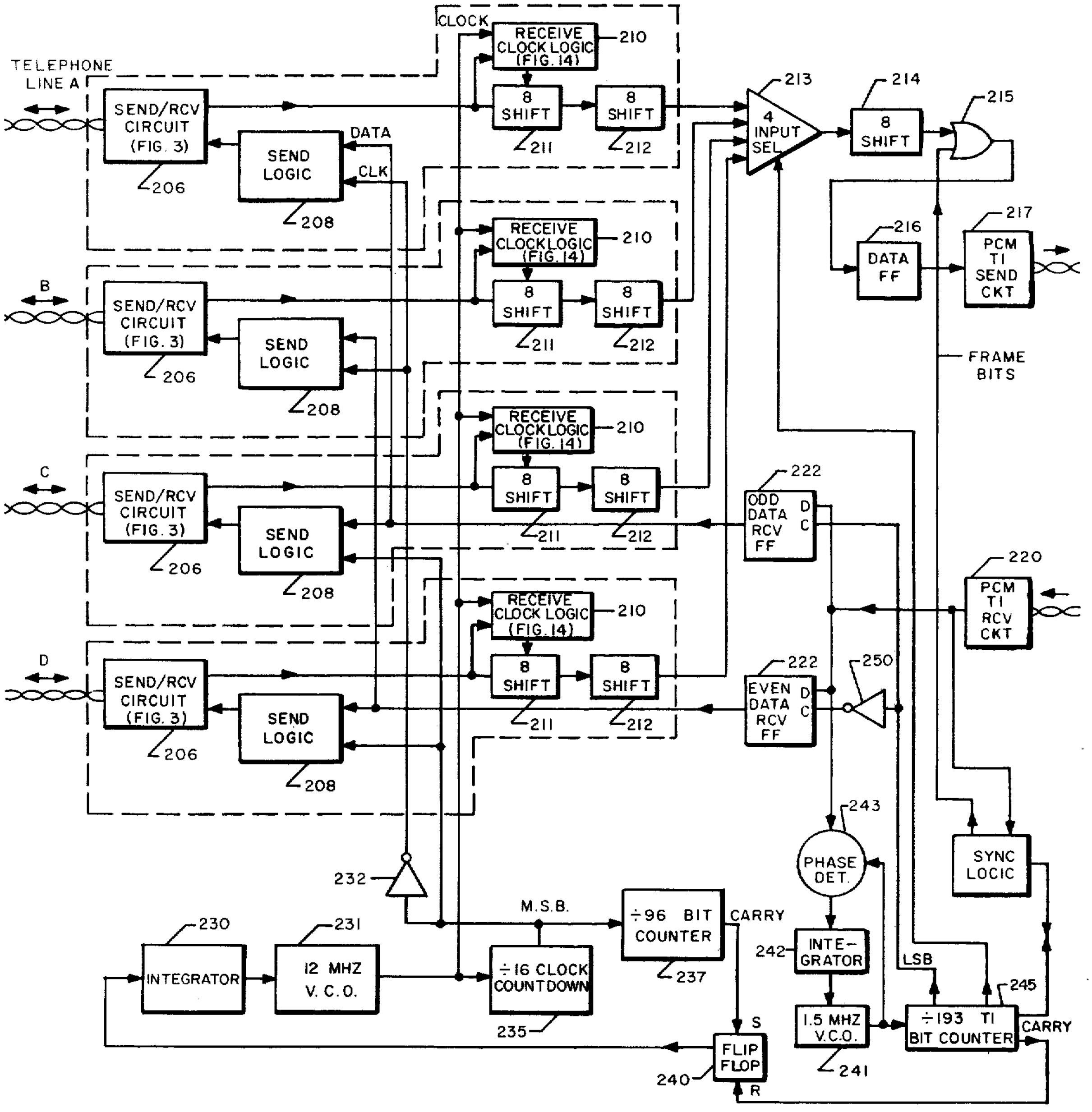
FIG. 13 is a block diagram of the T1 multiplexer.

FIG. 13 shows a block diagram of the complete T1 multiplexer. Four identical circuits (enclosed by dashed lines), handle the bidirectional signals for the four lines. These circuits receive and buffer M samples from the telephone, then send the complete samples out in proper order over the line via selector 213. The bit interleaved E samples and framing data is simply demultiplexed by two flip flops 222 and sent out on the proper bidirectional channels. Note that the frame timing of each of the four channels is different as defined by the timing of the multiplexed bits from the exchange. A dual clocking system to be described hereinafter generates two, phase locked, clocks for the two types of lines.

The M samples from four bidirectional, digital, telephone lines are independently shifted into shift registers 211 at the 0.77 Mhz clock rate. As soon as all 8 bits of an M sample are shifted in, the sample is shifted at 12 Mhz into a second register 212 where it waits to be sent out over the T1 line. Throughout the frame, at the beginning of each new M time slot shown in FIG. 12, the sample from the correct shift register is selected by selector 213 and shifted at 12 Mhz into shift register 214. During the time slot, the sample is shifted out with the 1.54 Mhz T1 clock via flip flop 216 and send circuit 217. Four framing bits are inserted during the first 4 bits of the frame by gate 215.

Figure 14:
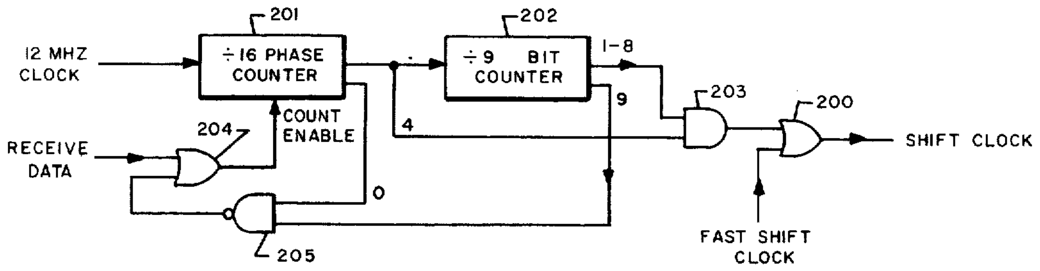
FIG. 14 is a schematic of the receive clock logic.

Since the M samples coming back over the bidirectional line each have a different phase due to the variable propagation delay, an asychronous receive clock circuit 210, similar to those used to receive teletype characters, is used to shift the samples into registers 211, FIG. 14 shows a possible embodiment of that circuit. Each M sample is shifted in by a clock of exactly the same frequency as that of the E sample transmissions but with one of 16 phases. A phase counter 201 for each channel counts down a 12 Mhz clock to exactly the right frequency. Before the 1 start bit that preceeds each 7 bit M sample is received, the counter is prevented from counting by gates 204 and 205. When the start bit is received, the receive data input enables the counter via gate 204. Four clocks after the counter is released, a receive clock is generated which clocks the start bit at its center and advances the bit counter 202. Every 16 counts, another receive clock is generated, at the center of another bit, until the bit counter reaches 9, again stopping counter 201 until another start bit is received.

Since the 193 bits in the T1 frame are not exactly divisible by 2, another phase locked loop clock circuit formed by integrator 230, V.C.O. 231, ÷16 clock countdown 235, ÷96 bit counter 237, and flip flop 240 is required to generate the clock for the telephone lines. This loop locks in such that the output duty cycle of flip flop 240 is exactly 50 percent when the frame time of the 96 bit telephone frame is exactly equal to the T1 frame time. As the odd/even multiplexed 96 bit telephone frames require $2 \times 96 = 192$ bits from the T1 line, the T1 framing bit is discarded. The telephone Voltage Controlled Oscillator 231 operates at 16 times the required bit rate to provide the clock needed for the receive clock logic 210.

T1 data from the exchange is already properly formatted so bits are alternately clocked into the odd and even data receive flip flops 222 and clocked into the send logic 208 during the proper half frame. The send logic generates the Alternate Mark Inversion send signals and sends the E samples, and framing, and signaling information out over the telephone lines via the send receive circuits 206.

On telephone lines shorter than 3600 feet the bidirectional signals can be used all the way to the exchange.

In the interest of equipment standardization, a multiplexer as shown in FIG. 13 is still used at the exchange.

While the embodiment described here is designed to fit into the American system of Pulse Code Modulation telephony because it operates at a clock rate which is half of the 1.544 Mb/s rate for T1 lines, it could as well be designed to fit other standards such as the C.E.P.T. international standard. The telephone line rate in this case would be half of the 2.048 Mb/s data rate for this system. Since the 256 bits in a frame for this system is divisible by 2, the double clock oscillator system in FIG. 13 would not be necessary. Due to the increased number of bits available per frame, the number of time slots available could be increased to 6, or the guard bands 18 in FIG. 4 could be widened for greater cabling flexibility.

Figure 15:
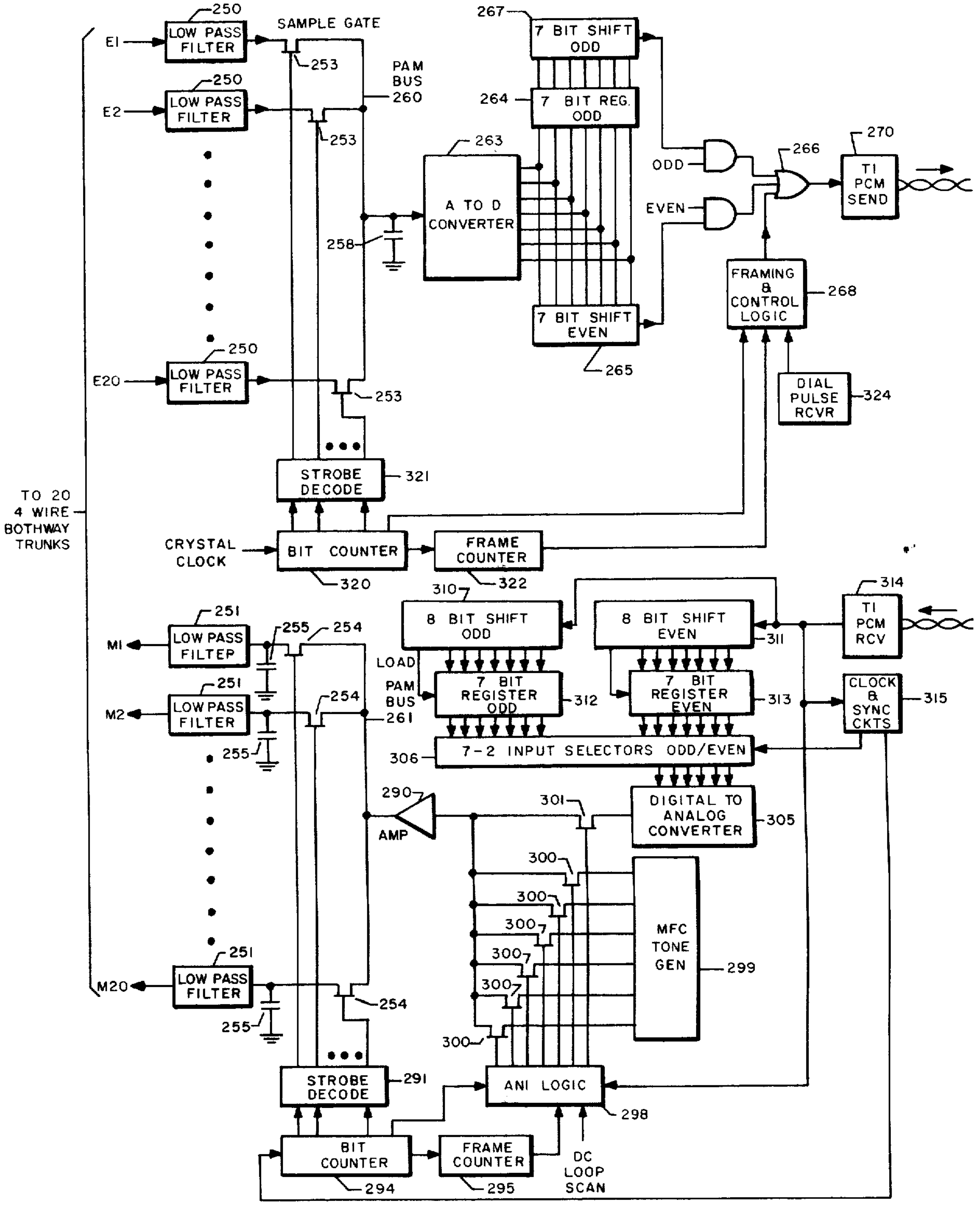
FIG. 15 is a block diagram of a terminal for use with an analog telephone exchange.

FIG. 15 is a block diagram of an exchange terminal which connects up to 64 digital telephones to 20, four-wire, both way, analog trunks on a conventional, analog, telephone exchange. Note that each trunk represents one time slot on one of the telephone lines. A T1 signal from the multiplexer of FIG. 13 is connected to the terminal by two twisted pair lines. While special integrated circuits, similar to those used in the telephone, could be used, the embodiment shown in FIG. 15 uses techniques similar to those used in the Bell System D1 PCM terminal in that a single, high speed, digital to analog 305 and analog to digital 263 converter is time shared bewteen the various channels. Sample gates 253 gate one analog E signal at a time onto a single Pulse Amplitude Modulation bus 260 where the sample value is held on a capacitor 258. Analog to digital converter 263 digitizes the sample with the same $\mu$=100 logarithmic compression law used in the telephone. Samples are alternately held in the odd register 264 and the even shift register 265. The odd shift register 267 is loaded from register 264 with the same clock that loads the even shift register 265. Both registers are shifted on every other send clock as the bits are sent out alternately from the two registers via selector gate 266 and the send logic 270. The framing and control logic 268 inserts the framing bits and also inserts a signaling bit on the correct frame and to cause of the correct telephone as indicated by dialing or other signaling from the exchange.

The M signals coming in from the multiplexer are received by receive circuit 314 and clock circuit 315. The bit stream is alternately shifted into shift registers 310 and 311 separating odd and even bits. Each time a full sample shifts in, the arrival of the start bit causes the sample to be loaded into the odd and even registers 312 and 313. Digital selector 306 gates one or the other register output to the input to the digital to analog converter 305. The analog output passes through analog gate 301 and amplifier 290 to the Pulse Amplitude Modulation bus 261. The sampling gate 254 for the channel corresponding to the digital M sample is turned on by strobe decode 291 causing the analog M value to be stored on hold capacitor 255. Low pass filter 251 removes sampling noise and outputs the analog replica of the microphone signal for that time slot of that line to the trunk input of the exchange.

When a telephone first goes off hook the appearance of the start bit during a particular frame time identifies the calling telephone, the identity of the calling party is stored in a buffer in the ANI logic 298. D.C. signaling the exchange causes the trunk to be seized. The exchange answers with a D.C. signal asking for identification of the calling party. The Automatic Number Identification logic 298 replies with Multiple Frequency Code signaling by gating on combinations of two of the six tones from the tone generator 299 via analog switches 300.

Since telephone signals can be switched much more economically and reliably in digital form, the analog terminal just described is really a temporary expedient for making use of existing analog telephone exchanges while gaining some of the advantages of a digital telephone system. Ultimately, the digital lines should be switched directly by digital exchanges. An example of a modern computer controlled digital exchange is described in a paper by Mr. H. Earle Vaughan of Bell Laboratories entitled "An Introduction to No. 4 ESS" in the proceedings of the International Switching Symposium of 1972 in Boston, Mass. The basic inputs to this exchange are serial bit streams of 128, 8 bit time slots at an 8 Mb/s data rate. One of these lines can thus be fed by a terminal which multiplexes 20 digital telephone lines or 5 T1 multiplexed lines into the single 8 Mb/s bit stream. As signaling information is sent to the computer controling the exchange via a separate Common Channel Interoffice Signaling line, the terminal simply converts the signaling and number identification information into the proper digital format. A single terminal can thus handle up to 20 × 16 = 320 telephones. Since the digital telephone lines have concentrated traffic like trunks, local and toll exchanges are basically identical.

Figure 16:
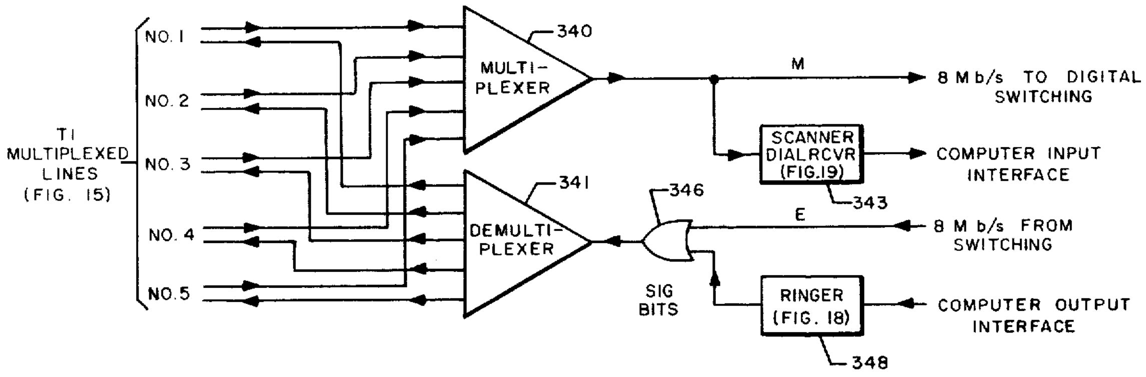
FIG. 16 is a block diagram of a terminal for use with a digital telephone exchange.

FIG. 16 shows a terminal for use with a digital exchange like the Bell No. 4 ESS. The M samples from 5 T1 multiplexed lines are multiplexed into the proper 8 Mb/s serial format by multiplexer 340 and sent to the Time Slot Interchange unit of the digital switching part of the exchange. The 8 Mb/s bit stream from the exchange containing E samples is demultiplexed into 5 T1 channels with the format of FIG. 12 by demultiplexer 341. The signaling bit is added to the signal by gate 346.

Figure 17:
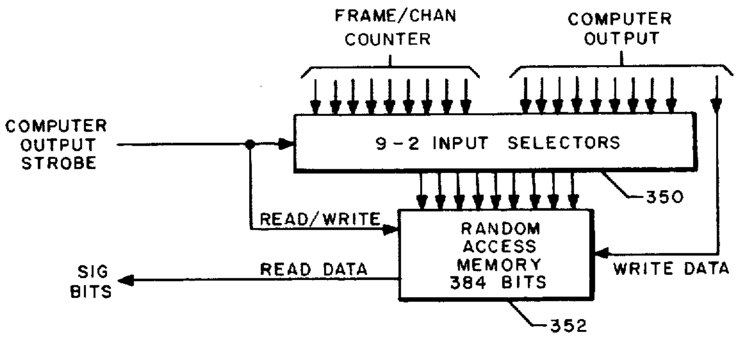
FIG. 17 is a block diagram of the ringer logic of the digital terminal.

FIG. 17 shows the ringer logic which allows the computer to set and reset signaling bits as desired. The computer simply outputs the binary address of the line and the desired state of the signaling bit. This state is written into a random access memory 352 which has one bit for each telephone on the terminal. An address selector 350 causes the bit to be written in the location specified by the computer output word. The bits are read out in a fixed order by using the state of the frame and channel counter as the read address of the memory.

Figure 18:
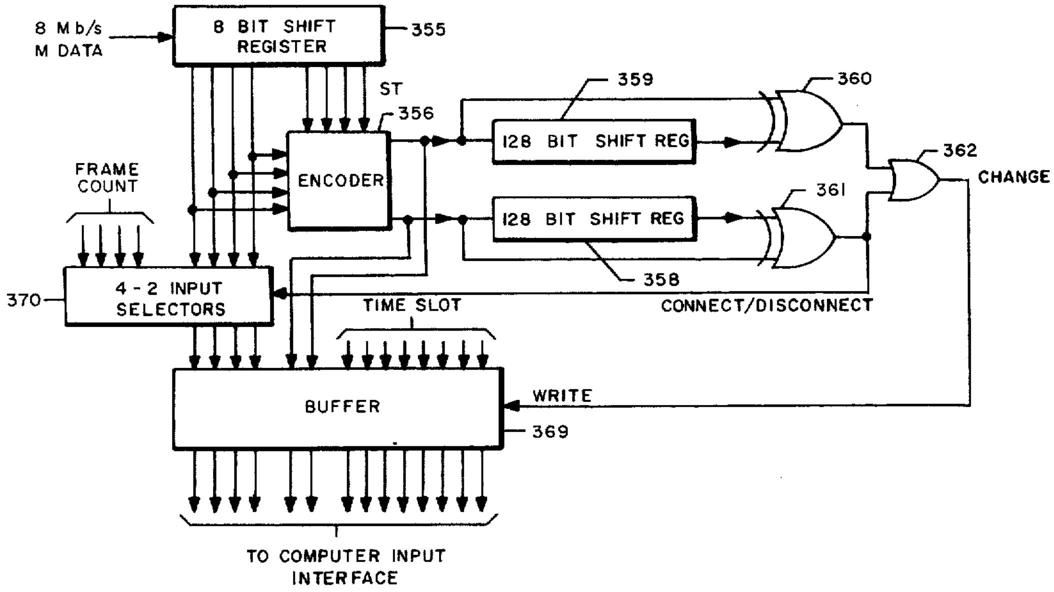
FIG. 18 is a block diagram of the scanner/dial receiver logic of the digital terminal.

FIG. 18 shows the scanner/dial receiver logic which continually looks for changes in the M samples and reports those of interest to the computer input. Each M sample is shifted into register 355 and encoded by encoder 356 into a 2-bit code indicating: no start bit, idle code, or digit code. Two 128 bit shift registers 358 and 359 store the previous state of this 2 bit code for each of the 128 time slots. The output of these shift registers is always the previous 2 bit code for the present time slot. Gates 360, 361 and 362 compare the 2 bit code from the previous frame with the present 2 bit code. If a change is detected, a write cycle into the buffer 369 is initiated. This buffer is periodically emptied out by the computer. The time slot number, the 2 bit code and the output of 2 input selector 370 is stored in the buffer. The 2 input selector selects the frame count if the change was of the on hook/off hook type, otherwise it stores the digit code. The computer thus receives messages indicating when a telephone goes on hook or off hook with a binary code identifying the telephone and the time slot, and it receives a binary digit and time slot identification when a push button is pressed.

While particular embodiments of the present invention have been shown and described, it is apparent that adaptations and modifications may be made without departing from the spirit and scope of the present invention as set forth in the claims.

What is claimed is:

1. A time division multiplex telephone system comprising: terminal means for transmitting and receiving a plurality of telephonic signals from one end only of a single bidirectional wire pair in a repetitive time frame format having a plurality of sequential E time slots transmitted from said terminal means in one time interval and a corresponding plurality of M time slots received at said terminal means in a different time interval, each of said telephonic signals occupying a pair of E and M time slots; and a plurality of telephones connected across said wire pair in parallel to said terminal means, each of said telephones including logic circuitry means for conditioning said telephones to receive and transmit bidirectional telephonic signals in an assigned corresponding pair of E and M time slots, said terminal means including means for receiving M sample transmissions at times which are delayed by round trip delays existing between said terminal means and respective telephones.

2. Apparatus according to claim 1 wherein said circuitry includes independent means in the terminal and in each telephone for selecting the first available time slot in the frame number assigned to the telephone to be connected.

3. Apparatus according to claim 1 wherein said logic circuitry includes assignment means for selecting on demand a vacant M time slot and the corresponding E time slot as said assigned pair of time slots for an outgoing call.

4. Apparatus according to claim 3 wherein said plurality of telephones exceed in number said plurality of E or M time slots.

5. Apparatus according to claim 3 wherein said assignment means is additionally responsive to the receipt of an identification signal from said terminal means for selecting a vacant M time slot and the corresponding E time slot as said assigned pair of time slots for an incoming call.

6. Apparatus according to claim 5 wherein each of said frames includes an identification bit position and a plurality of frames comprise a multiframe and wherein the assignment means of each of said telephones is associated with and responsive to the presence of a signal in the identification bit position of a different frame of the multi-frame.

7. Apparatus according to claim 6 wherein the logic circuitry of each of said telephones includes a frame counter for counting the frame number of the present frame with respect to the multi-frame, and means responsive to said frame counter for enabling said assignment means during the frame associated with said telephone.

8. Apparatus according to claim 3 wherein the logic circuitry of each of said telephones includes storage means for storing the presently assigned E and M time slot number, time slot counter means for counting the number of the present time slot and means for enabling transmission in response to coincidence between said storage means and said time slot counter.

9. Apparatus according to claim 1 wherein each of said frames includes a plurality of guard bands between the M slots to accommodate propogation delay from the most remote to the nearest telephone.

10. A time division multiplex telephone system comprising:

a first plurality of telephones each adapted to transmit and receive bidirectional telephonic signals in a bidirectional time division multiplex format;

a second plurality of bidirectional transmission pairs, said second plurality being less in number than said first plurality for connecting at least two of said telephones in parallel;

multiplexer means for interleaving the signals from said bidirectional pairs into a unidirectional time division multiplex format adapted for transmission over two unidirectional transmission paths and for separating and coupling the two unidirectional signals onto said bidirectional pairs in said bidirectional format; and a pair of unidirectional transmission pairs connected to said multiplexer means carrying said unidirectional format signals from and to said multiplexer, respectively.

11. Apparatus according to claim 10 wherein said unidirectional format comprise T1 format.

12. Apparatus according to claim 10 wherein said bidirectional format comprises a repetitive time frame format having a plurality of sequential E time slots for transmission of signals from said telephones to said multiplexer and a corresponding plurality of sequential M time slots for the transmission of signals from said multiplexer to said telephones, each of said bidirectional signals occupying a corresponding pair of E and M time slots.

13. Apparatus according to claim 12 wherein each of said at least two telephones includes logic circuitry for conditioning said telephone to receive and transmit bidirectional telephonic signals in a variably assigned corresponding pair of E and M time slots.

14. Apparatus according to claim 13 wherein the number of telephones connected in parallel exceeds in number said plurality of E or M time slots.

15. Apparatus according to claim 13 wherein said logic circuitry includes assignment means for selecting on demand a vacant M time slot and the corresponding E time slot as said assigned pair of time slots for an outgoing call.

16. Apparatus according to claim 13 wherein said assignment means is additionally responsive to the receipt of an identification signal from said multiplexer means for selecting a vacant M time slot and the corresponding E time slot as said assigned pair of time slots for an incoming call.

17. Apparatus according to claim 16 wherein each of said frames includes an identification bit position and a plurality of frames comprise a multiframe and wherein the assignment means of each of said telephones is associated with and responsive to the presence of a signal in the identification bit position of a different frame of the multiframe.

18. Apparatus according to claim 13 wherein the logic circuitry of each of said telephones includes an oscillator synchronized to the repetitive frame format of said terminal means to maintain synchronism between all of said telephones and said terminal means.

19. Apparatus according to claim 10 wherein said telephonic signals are pulse code modulated and wherein said multiplex means byte interleaves the signals from said bidirectional pairs.

20. A time division multiplex telephone system comprising: terminal means for transmitting and receiving a plurality of telephonic signals from one end only of a single bidirectional wire pair in a repetitive time frame format having a plurality of sequential E time slots transmitted from said terminal means in one time interval and a corresponding plurality of M time slots received at said terminal means in a different time interval, each of said telephonic signals occupying a pair of E and M time slots: and a plurality of telephones connected across said wire pair in parallel to said terminal means, each of said telephones including logic circuitry means for conditioning said telephones to receive and transmit bidirectional telephonic signals in an assigned corresponding pair of E and M time slots, said terminal means including means for receiving M sample transmissions at times which are delayed by round trip delays existing between said terminal means and respective telephones, and logic circuitry means for variably assigning said pair of E and M time slots so that a vacant pair of said time slots is assigned to a particular telephone only when needed to complete a call.

21. Apparatus according to claim 20 wherein said circuitry includes independant means in the terminal and in each telephone for selecting the first available time slot in the frame number assigned to the telephone to be connected.

22. Apparatus according to claim 21 wherein said assignment means is additionally responsive to the receipt of an identification signal from said terminal means for selecting a vacant M time slot and the corresponding E time slot as said assigned pair of time slots for an incoming call.

23. Apparatus according to claim 22 wherein each of said frames includes an identification bit position and a plurality of frames comprise a multiframe and wherein the assignment means of each of said telephones is associated with and responsive to the presence of a signal in the identification bit position of a different frame of the multiframe.

24. Apparatus according to claim 20 wherein said plurality of telephones exceed in number the plurality of time slots in a frame.

* * * * *